United States Patent [19]
Hang

[11] Patent Number: 5,974,494
[45] Date of Patent: *Oct. 26, 1999

[54] METHOD AND APPARATUS FOR PACKING DIGITAL DATA

[75] Inventor: Chia-Lun Hang, Fremont, Calif.

[73] Assignee: Samsung Electronics Co., Ltd., Seoul, Rep. of Korea

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/808,556

[22] Filed: Feb. 28, 1997

Related U.S. Application Data

[63] Continuation of application No. 08/238,273, May 4, 1994, Pat. No. 5,649,127.

[51] Int. Cl.[6] .................................................. G06F 13/38
[52] U.S. Cl. .......................................... 710/127; 712/300
[58] Field of Search ........................... 395/307; 710/127, 710/126, 128, 129, 68; 370/402; 712/300; 341/60, 95

[56] References Cited

U.S. PATENT DOCUMENTS

| | | | |
|---|---|---|---|
| 4,144,562 | 3/1979 | Cooper | 710/127 |
| 4,205,373 | 5/1980 | Shah et al. | 710/128 |
| 4,291,370 | 9/1981 | Charles | 710/129 |
| 4,309,754 | 1/1982 | Dinwiddie, Jr. | 710/127 |
| 4,447,878 | 5/1984 | Kinnie et al. | 710/127 |
| 4,455,606 | 6/1984 | Cushing et al. | 710/127 |
| 4,502,115 | 2/1985 | Eguchi | 710/127 |
| 4,766,538 | 8/1988 | Miyoshi | 395/307 |
| 5,073,969 | 12/1991 | Shoemaker | 395/307 |
| 5,109,332 | 4/1992 | Culley | 395/307 |
| 5,142,672 | 8/1992 | Johnson et al. | 395/500 |
| 5,321,398 | 6/1994 | Ikeda | 341/67 |
| 5,423,010 | 6/1995 | Mizukami | 341/60 |
| 5,471,632 | 11/1995 | Gavin et al. | 710/104 |
| 5,524,256 | 6/1996 | Turkowski | 712/300 |
| 5,548,786 | 8/1996 | Amini et al. | 395/842 |

OTHER PUBLICATIONS

Motorola, Inc. "M68000 Family Reference", 1988, pp. 3–116 to 3–119.

*Primary Examiner*—Paul R. Myers
*Attorney, Agent, or Firm*—Skjerven, Morrill, MacPherson, Franklin and Friel

[57] ABSTRACT

A system device of a PC, XT or AT type computer having an ISA bus is provided with a dynamic 32-bit bus by packing circuits or PACs (142, 152) located on user add-on cards. Each PAC includes a state machine (200) which controls four tag registers (210, 211, 212, 213), four input data registers (220, 221, 222, 223), four output data registers (240, 241, 242, 243), and an output multiplexer (250). The four tag registers are for storing a byte-high enable signal BHEN and system address bits SA[1:0] associated with bytes, words, and doublewords presented to the PAC during bus write cycles. The four input data registers are for storing the bytes, words, and doublewords presented to the PAC during bus write cycles. These bytes, words, and doublewords are steered to appropriate bit positions in the input data registers by four steering circuits (214, 215, 216, 217), which are controlled by the platform type signal CR2B2_1 and by the output of a decoder decoding the outputs of the tag registers. The four output data registers are for storing outputs of the four input registers received through an encoder (234). The output multiplexer is for selecting an output of one of the output registers. For AT-type platforms, up to two adjacent words are packed into one 32-bit doubleword for output. For PC and XT type platforms, up to four adjacent bytes are packed into one 32-bit doubleword for output. The PACs are also compatible with computers having EISA or PCI buses. During 32-bit EISA or PCI bus cycles, the input doubleword is furnished as the output doubleword.

1 Claim, 4 Drawing Sheets

METHOD AND APPARATUS FOR PACKING DIGITAL DATA

CROSS-REFERENCE TO RELATED APPLICATION.

This application is a continuation of application Ser. No. 08/238,273,filed May 4, 1994, now U.S. Pat. No. 5,649,127.

BACKGROUND OF THE INVENTION

1. Field of the Invention

The present invention relates to computer buses, and more particularly to methods and apparatus for optimizing bus bandwidth.

2. Description of Related Art

Various computer bus structures and bus protocols are well known in the art. One such bus is the ISA bus. ISA stands for industry standard architecture, and is a bus specification originally developed for PC and XT type personal computers, which provide 8-bit slots for connection of platform resources, and for AT type personal computers, which provide 8-bit and 16-bit slots for connection of platform resources. Platform resources include user add-on cards, which are readily inserted and removed by the user. Originally found in computer systems based on the type 8088 and 80286 microprocessors, the ISA bus is also used in more advanced personal computers, including those based on the type 80386 and 80486 microprocessors. These microprocessors and the personal computer systems based on them are available from various manufacturers, including Intel Corporation of Santa Clara, Calif., and IBM Corporation of Armonk, N.Y.

The ISA bus is specified as a low performance bus, being limited to a data size of 16-bits, a memory address space of 16 megabytes ("MB"), and a bus clock speed of 8 megahertz ("MHz"). Newer system buses such as the EISA bus and various local buses such as the VESA bus and the PCI bus have been introduced. These newer buses are considerably faster than the ISA bus, and so are advantageous for communicating I/O signals between the system microprocessor and such high performance peripheral devices as high resolution graphical video displays and high speed cachable hard disk drives. However, because the PC, XT and AT type personal computer systems cannot be upgraded to the newer high performance buses without replacing their motherboards, which is a prohibitively expensive option, the ISA bus is likely to remain in widespread use. Moreover, ISA compatibility is increasingly being required for embedded systems.

Platforms using the ISA bus as their system bus cannot take full advantage of higher performance peripheral devices that can be made available in the form of user add-on cards which plug into the ISA bus. This situation is particularly unfortunate since the advent of multimedia. ISA bus platforms used for multimedia typically must be upgraded with high bandwidth peripheral devices such as high resolution graphics accelerators and multimedia add-on cards. The performance of these upgraded ISA bus platforms, compromised by their ISA bus, is often disappointing.

SUMMARY OF THE INVENTION

The present invention provides for a dynamic computer bus during system bus memory write cycles to better utilize memory.

In one embodiment, a tag memory has outputs to provide low order address bits for each of the successive write accesses. A decoder coupled to the tag memory has outputs to indicate which byte fields of the successive write accesses are valid. A plurality of steering circuits coupled to the decoder have outputs to direct data from each successive transfer into bit positions of respective entries of an input data memory. An encoding circuit coupled to the input data memory has outputs coupled to an output data memory to direct progressively combined data from the input data memory to respective entries of the output data memory. A multiplexer coupled to outputs of the output data registers has an output to furnish a selected one of the entries of the output data memory.

In another embodiment, first data is provided on the system bus during a first system bus memory write cycle, and the first data is written into a first segment of a first register and into a first segment of a second register. Second data is provided on the system bus during a second system bus write cycle to the device. When the second data has an address adjacent to the address of the first data and the second system bus write cycle follows the first system bus memory write cycle without intervening memory write cycles, the second data is written into a second segment of the second register. The first and second segments of the second output register are then furnished from the second register.

BRIEF DESCRIPTION OF THE DRAWINGS

In the drawings, where like reference characters indicate like parts.

DETAILED DESCRIPTION OF THE PREFERRED EMBODIMENT

Figure 1:
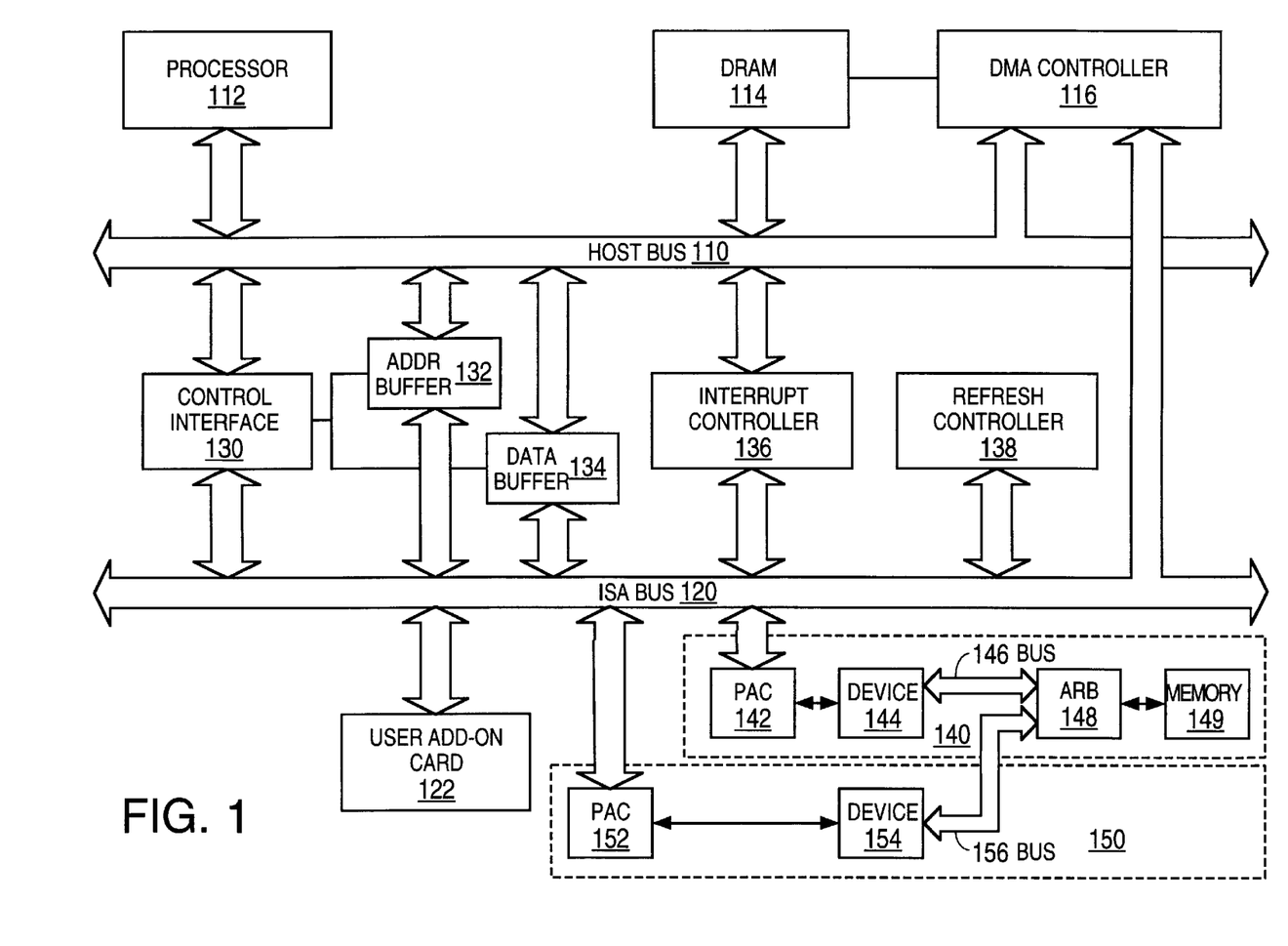
FIG. 1 is a block schematic diagram of a computer system which includes an ISA bus.

An illustrative ISA bus platform which includes a dynamic 32-bit computer bus implemented in user add-on cards 140 and 150 is shown in FIG. 1. The host bus 110 represents a high performance computer bus that hosts the system processor 112 and, in some implementations, a variety of platform resources. The host bus 110 is implemented in a variety of ways, depending on the manufacturer. In the embodiment of FIG. 1, the host bus 110 is accessible by processor 112, dynamic random access memory ("DRAM") 114, and direct memory access ("DMA") controller 116. The processor 112 is the primary processor of the platform, and is the first bus owner after power-up and after system reset. In personal computer systems, the processor 112 is an X86 family processor such as the 8088, 80286, 80386, 80486 and Pentium™ microprocessors available from Intel Corporation of Santa Clara, Calif. The DRAM 114 is the platform memory resource. The DMA controller 116 controls the transfer of data directly between input/output ("I/O") resources and memory resources such as the DRAM 114, and arbitrates for system ownership with other platform resources that can become system owner, including the processor 112, a refresh controller 138, a conventional user add-on cards 122, and high performance user add-on cards 140 and 150.

Interface circuitry between an ISA bus 120 and the host bus 110 includes a control interface 130, an address buffer 132, and a data buffer 134. The control interface 130 translates the control line protocol of the host bus 110 to the control line protocol of the ISA bus 120 and vice versa. The address buffer 132 buffers the address signal lines between the host bus 110 and the ISA bus 120. The data buffer 134 buffers the data signal lines between the host bus 110 and the ISA bus 120.

Other platform controllers include an interrupt controller 136 and a refresh controller 138. The interrupt controller 136 supports the interrupt request signal lines of the host bus 110 and the ISA bus 120. The refresh controller 138 executes refresh cycles for platform and bus memory components, and so is capable of system ownership. On PC and XT type computers, the refresh controller is a DMA channel 0 cycle. On AT type computers, it is separate dedicated circuitry, as shown in FIG. 1.

The user add-on cards 140 and 150 include respective packing circuits ("PAC") 142 and 152, which impart a dynamic 32-bit bus character to the ISA bus 120 as seen from the add-on cards 140 and 150, whether the platform is an AT-type or XT-type platform. In the embodiment shown, PACs 142 and 152 are identical. Cards 140 and 150 each include an integrated circuit or set of integrated circuits that implement respective devices 144 and 154. Device 144 may include, for example, a super-VGA graphics driver, while device 154 may include, for example, a multimedia device such as a video frame buffer device. Device 144, which is associated with a memory 149, is interfaced to the ISA bus 120 through the PAC 142. The memory 149 is illustratively any suitable video memory such as two megabyte DRAM memory or VRAM memory, and the device 144 is connected to the memory 149 through the bus 146 and an arbitration circuit 148. Device 154 is interfaced to the ISA bus 120 through the PAC 152, and is connected to the memory 149 through a bus 156 and the arbitration circuit 148. A portion of the bus 156 is a cable connecting the add-on cards 140 and 150 to one another.

The dynamic 32-bit character imparted to the ISA bus 120 by the PACs 142 and 152 results is improved performance of the peripheral functions performed by add-on cards 140 and 150. For example, where the add-on card 140 is a high resolution graphics accelerator and add-on card 150 is a multimedia video capture and processing card, the devices 144 and 154 would require frequent access to the memory 149. Without the PACs 142 and 152, this access would be in effect 16-bit accesses for an AT-type platform and 8-bit accesses for a PC-type or XT-type platform, even though the bus width of buses 146 and 156 is, in this embodiment, 32-bits. The frequent attempts at access by devices 144 and 154 would casue contention from time to time for the memory 149. The frequent contending accesses would need to be arbitrated, which would result in delays and poor performance. The PACs 142 and 152 pack adjacent 16-bit and 8-bit accesses into 32-bit doublewords, which are communicated to the memory 149. Because the full bandwidth of the 32-bit memory is used on these occasions, the frequency of access and hence the likelihood of contention is reduced. Improved performance of the peripherals provided by the add-on cards 140 and 150 is realized.

Figure 2:
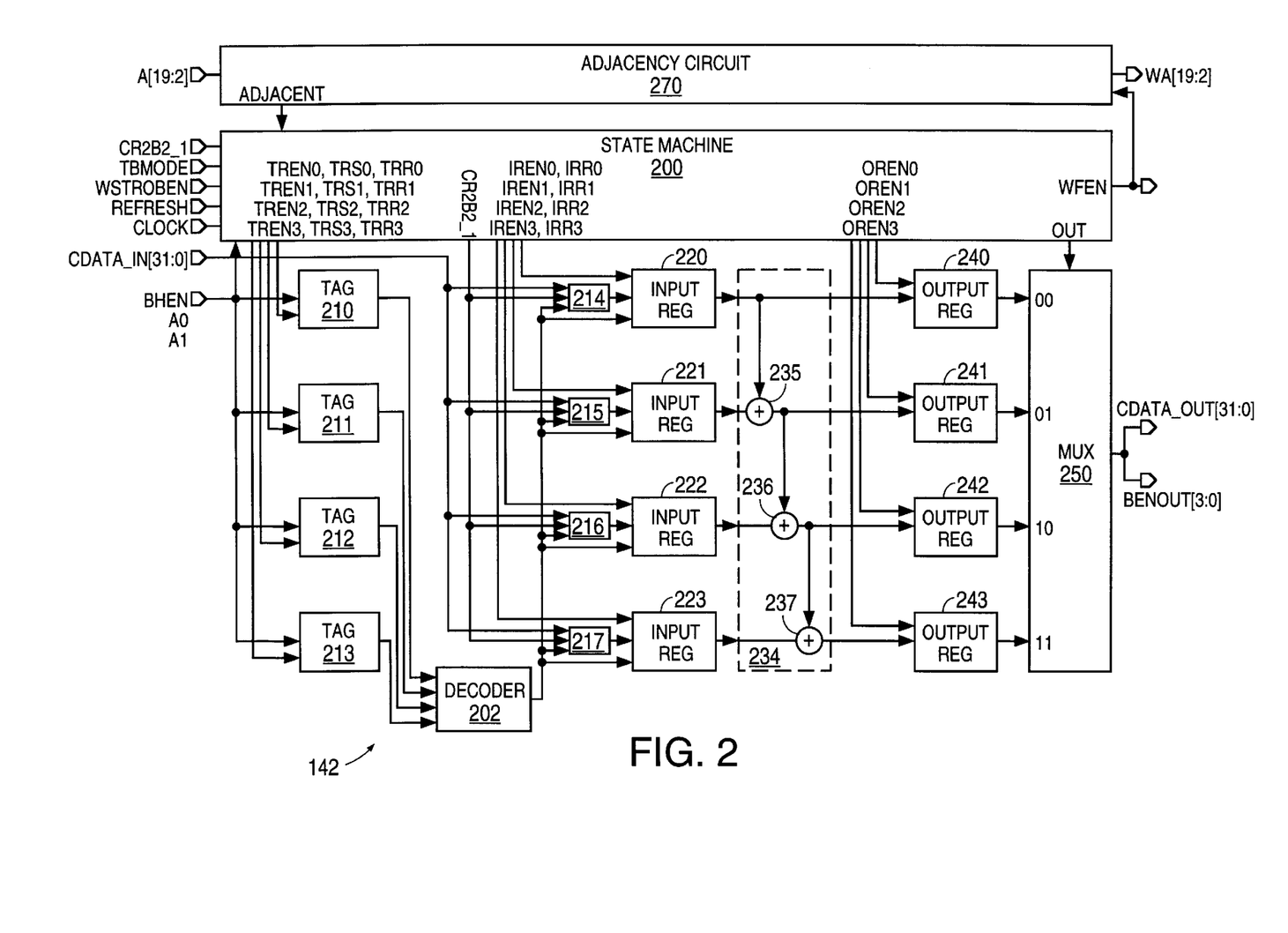
FIG. 2 is a schematic diagram of a bus controller.

The PAC 142 on the user add-on card 140 is shown in FIG. 2; the PAC 152 on the user add-on card 150 is identical in this embodiment. The PAC 142 imparts a dynamic 32-bit character to the ISA bus 120 for adjacent addresses, as shown in FIGS. 3A, 3B, 3E and 3F. Address adjacency is determined from system address bits SA[19:2]. Addresses with identical bits SA[19:2] are deemed to be adjacent.

Figure 3A:
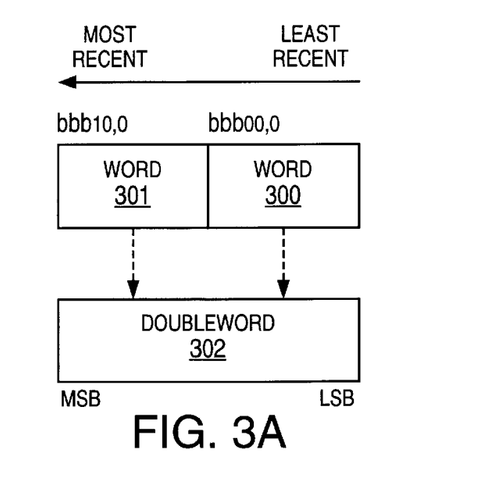
FIG. 3 is a pictorial diagram illustrating the operation of the bus controller of FIG. 2.
Figure 3B:
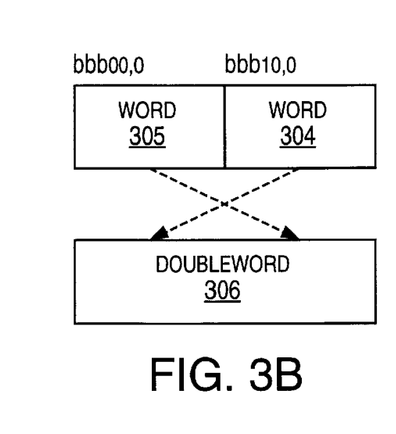

When installed in an AT type computer and during 16-bit ISA bus write cycles, the PAC 142 packs up to two adjacent words (16-bit) in ascending order into a doubleword (32-bit). FIG. 3A shows the packing of words 300 and 301 for an address sequence bbb00 and bbb10 into doubleword 302, and FIG. 3B shows the packing of words 304 and 305 for the inverse address sequence bbb10 and bbb00 into doubleword 306. The bit shown following the address is BHEN, the system byte high enable bit, is 0.

Figure 3C:
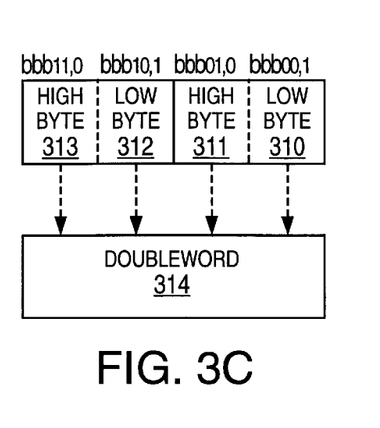
Figure 3D:
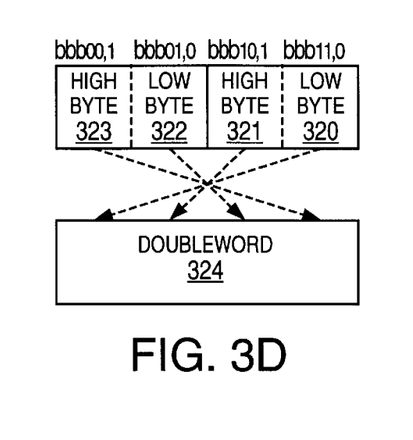

When installed in an AT-type platform and during 8-bit ISA bus write cycles, the PAC 142 operates in bypass mode (not shown) and outputs the four bytes in four respective doublewords, each byte occupying its proper location in the doubleword. The bypass mode simplifies design of the state machine 200, and reduces the amount of die space required for implementation of the state machine 200. Because of the relatively infrequent use of the 8-bit ISA bus write cycles by AT-type platforms, the simplicity:performance tradeoff is advantageous. However, if desired, the PAC 142 can be designed to pack up to four bytes from two adjacent words in ascending into a doubleword. FIG. 3C shows the packing of bytes 310, 311, 312 and 313 for an address sequence bbb00, bbb01, bbb10 and bbb11 into doubleword 314, wherein BHEN is 1 for addresses bbb00 and bbb10, and is 0 for addresses bbb01 and bbb11. FIG. 3D shows the packing of bytes 320, 321, 322 and 323 for the inverse address sequence bbb11, bbb10, bbb01 and bbb00, wherein BHEN is 1 for addresses bbb00 and bbb10, and is 0 for addresses bbb01 and bbb11. Packing is also performed for the various other permutations of adjacent address sequences (not shown) such as bbb01, bbb00, bbb11 and bbb10.

Figure 3E:
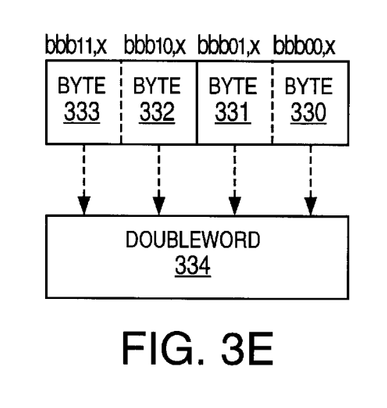
Figure 3F:
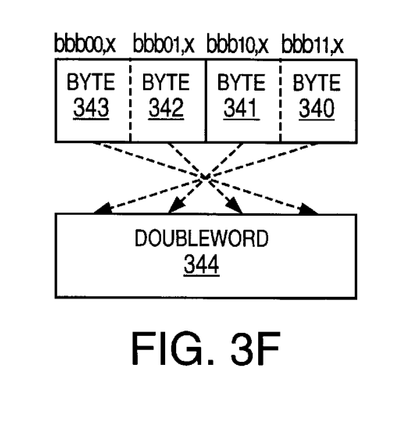

When installed in an XT or PC type computer, the PAC 142 packs up to four adjacent bytes in ascending order into a doubleword. FIG. 3E shows the packing of bytes 330, 331, 332 and 333 for an address sequence bbb00, bbb01, bbb10 and bbb11 into doubleword 334. FIG. 3F shows the packing of bytes 340, 341, 342 and 343 for the inverse address sequence bbb11, bbb10, bbb01 and bbb00 into doubleword 344. Packing is also performed for the various other permutations of adjacent address sequences (not shown) such as bbb01, bbb00, bbb11 and bbb10. Bit BHEN is undefined for an XT or PC type platform.

The PAC 142 includes a state machine 200, which receives various input signals derived from standard cycle and bus control signals on the ISA bus 120. Signal CR2B2_1 is a hardwired platform-dependent signal, which is 'b11 for a PC or XT type platform, 'b01 for an AT type platform, 'b10 for a VL type platform, and 'b00 for a PCI type platform. Signal TBMODE is the text mode signal, which is useful in a video controller for limiting packing to two bytes during video mode. Signal WSTROBEN is a write strobe enable signal derived from the following cycle control signals: signal MEMW which indicates memory writes cycles generally, signal SMEMW which indicates first megabyte memory writes for compatibility with 8-bit add-on slave cards, and signal IOW which indicates I/O write cycles. Signal REFRESH is the bus control signal REFRESH, which is driven by the refresh controller 138 to indicate memory refresh cycles. Signal CLOCK is a 50 Megahertz clock for the PAC 142.

The PAC 142 includes adjacency detection circuit 270, which furnishes the non-bus signal ADJACENT to the state machine 200. The adjacency detection circuit 270 compares bits [19:2] of the current and preceding system address SA, and asserts signal ADJACENT when the bits are identical. Upon assertion of a write enable signal WREN by the state machine 200, the adjacency detection circuit 270 furnishes a latched address on its output lines WA[19:2], which becomes the address of the 32-bit doubleword furnished on lines CDATA_OUT[31:0] of the PAC 142. The current system address SA[19:2] is then latched, and becomes the address for the next doubleword CDATA_OUT[31:0] to be furnished at the next assertion of WREN.

The PAC 142 also includes four tag registers 210, 211, 212 and 213. Tag register 210 stores parameters LBHEN0, LA0 and LA10, which are copied under control of the state machine 200 from signal BHEN and signals A0 and A1, which are the two least significant bits of the system address lines SA[19:0] of the ISA bus 120. Tag register 211 stores parameters LBHEN1, LA1 and LA11, which are copied from signals BHEN, A0 and A1 under control of the state machine 200. Tag register 212 stores parameters LBHEN2, LA2 and LA12, which are copied from signals BHEN, A0 and A1 under control of the state machine 200. Tag register 213 stores parameters LBHEN3, LA3 and LA13, which are copied from signals BHEN, A0 and A1 under control of the state machine 200. Tag register enable signals TRENx, tag register set signals TRSx, and tag register reset signals TRRx from the state machine 200 control operation of the tag registers 210, 211, 212 and 213 for x=0,1,2,3 respectively. The values latched into the tag registers 210, 211, 212 and 213 are applied to a decoder 202, which control the bit positions into which data is written to ensure correct ordering of data on the output CDATA_OUT[31:0]. The output of the decoder 202 is a bus having four valid bits, which are applied to steering circuits 214, 215, 216 and 217. Steering circuits 214, 215, 216 and 217 also receive the platform type signal CR2B2_1.

The steering circuits 214, 215, 216, and 217 are responsive to the valid bits of the decoder 202 to load four 32-bit input data registers 220, 221, 222 and 223 when enabled with signal CDATA_IN[31:0]. Each of the input data registers 220, 221, 222 and 223 also include four additional bits for receiving when enabled the valid bits from the decoder 202. In CDATA_IN[31:0], the sixteen low order bits are the first order data byte SD[7:0] and the second order data byte SD[15:8]. The sixteen high order bits CDATSA_IN[31:16] may be omitted or unused, or used for other purposes as discussed in the EISA and PCI bus example below. In an AT-type platform, the steering circuits 214, 215, 216, and 217 respond to the signal CR2B2_1 to direct the first and second order bytes of CDATA_IN[31:0] into either the lower 16-bit inputs or the upper 16-bit inputs of the input registers 220, 221, 222 and 223 respectively, depending on the valid bit output of the decoder 202. In a PC-type or XT-type platform, the steering circuits 214, 215, 216, and 217 respond to the signal CR2B2_1 to direct the first order byte of CDATA_IN[31:0] into either the first order 8-bit inputs, the second order 8-bit inputs, the third order 8-bit inputs, or the fourth order 8-bit inputs of the input registers 220, 221, 222 and 223 respectively, depending on the valid bit output of the decoder 202.

Input data register enable signals IRENx and input data register reset signals IRRx control operation of the input data registers 220, 221, 222 and 223 for x=0,1,2,3 respectively.

Four output data registers 240, 241, 242 and 243 are provided. Each receives 32-bits of data and 4 valid bits from one of the input data registers 220, 221, 222 and 223 through an encoder 234 under control of output data register enable signals ORENx (for x=0,1,2,3 respectively).

The encoder 234 is a group of wired-OR connections. One input to the encoder 234 is the output of the input data register 220, which is directed to the input of the output data register 240. A second input to the encoder 234 is the output of the input data register 221, which is combined with the output of the input data register 220 at wired-OR connection 235. The output of wired-OR connection 235 is furnished to the input of the output register 241. A third input to the encoder 234 is the output of the input data register 222, which is combined with the output of the wired-OR connection 235 at wired-OR connection 236. The output of wired-OR connection 236 is furnished to the input of the output register 242. A fourth input to the encoder 234 is the output of the input data register 223, which is combined with the output of the wired-OR connection 236 at wired-OR connection 237. The output of wired-OR connection 237 is furnished to the input of the output register 243.

A multiplexer 250 selects from among the outputs of the output data registers 240, 241, 242 and 243, and furnishes the selected 32-bit data output as signal CDATA_OUT [31:0] and the selected 4 valid bit output as signal BENOUT [3:0]. Multiplexer 250 is controlled by signal OUT from the state machine 200. When OUT is 00, input 00 is selected; when OUT is 01, input 01 is selected; when OUT is 10, input 10 is selected; and when OUT is 11, input 11 is selected.

Various output signals are provided by the state machine 200. Signal WFEN is a write enable signal. The various register enable, set, and reset signals and the OUT signal are previously described.

Figure 4:
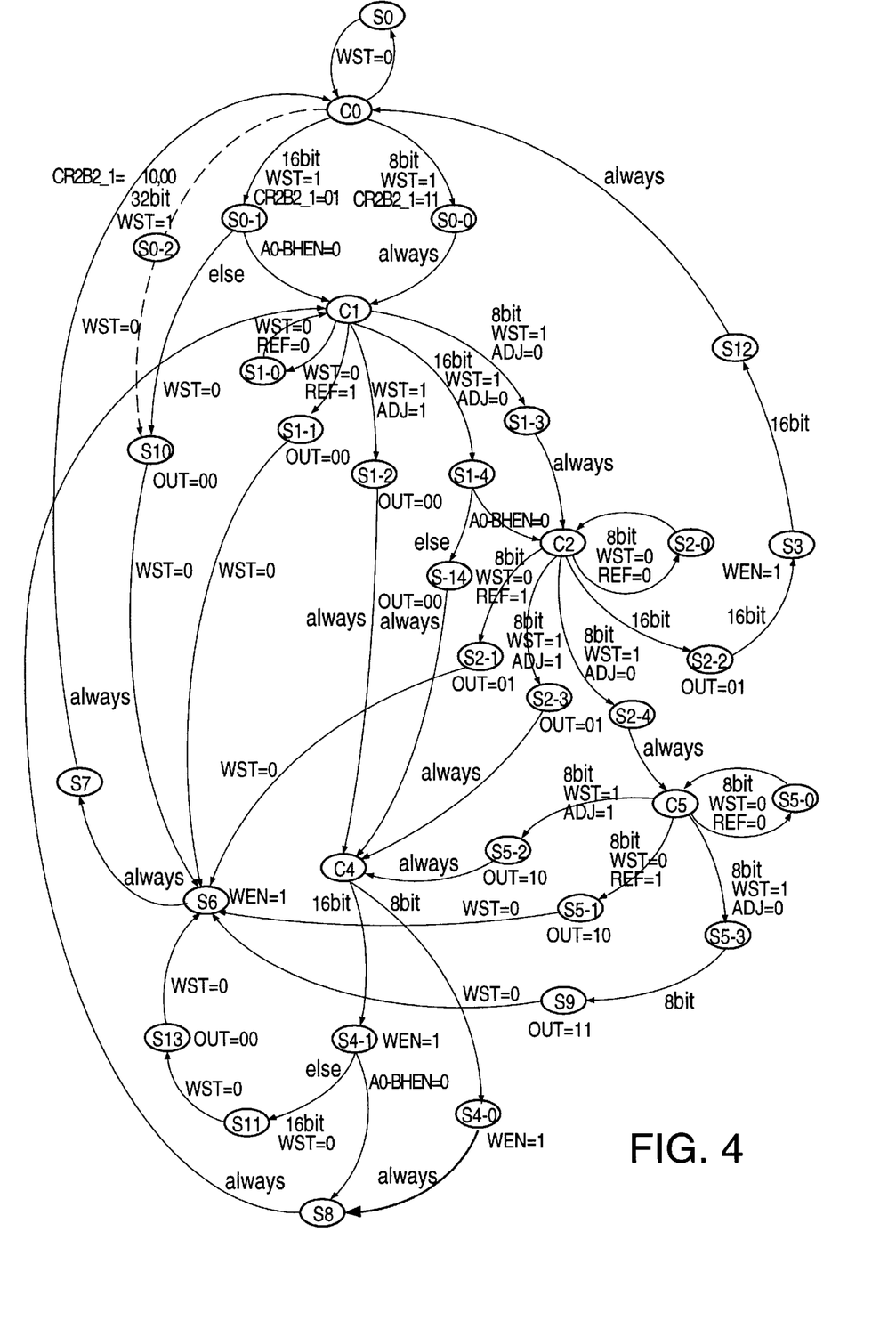
FIG. 4 is a state diagram for a state machine in the bus controller of FIG. 2.

FIG. 4 is a state diagram showing the various states of the state machine 200 which controls the PAC of FIG. 2. The PAC 142 accommodates both 16- and 8-bit bus cycles on the AT bus, and 8-bit bus cycles on the PC buses.

PAC AT Bus Cycles

Consider the case of an AT bus write bus cycle of two adjacent 16-bit words. An AT type bus is indicated to the PAC 142 by the bit cycle signal CR2B2_1 at 'b01. So long as the write strobe enable signal WSTROBEN (abbreviated in FIG. 3 as WST) is non-asserted, the PAC remains in state S0. While state S0 is current, the LA0 bits of the tag registers 210–213 are set, the LA1 bits of the tag registers 210–213 are reset, the LBHEN bits of the tag registers 210–213 are set, and the bits of the input data registers 220–223 are reset. State S0 is summarized in Table 1.

TABLE 1

SUMMARY OF STATE S0

| RANK OF REGISTER | TAG | | | DATA |
|---|---|---|---|---|
| | LA1x | LA0x | LBHENx | |
| x = 0 (Tag 210, Data 220) | 0 | 1 | 1 | 0 |
| x = 1 (Tag 211, Data 221) | 0 | 1 | 1 | 0 |
| x = 2 (Tag 212, Data 222) | 0 | 1 | 1 | 0 |
| x = 3 (Tag 213, Data 223) | 0 | 1 | 1 | 0 |

The state machine 200 changes to state S0-1 from state S0 through condition C0 on the assertion of WSTROBEN to indicate that a bus write cycle is enabled for the first word transfer. The values of the signals A1, A0 and BHEN are latched into tag register 210, and the first data word asserted on lines CDATA_IN[15:0] is steered into certain bit positions of the input data register 220 by steering circuit 214 under control of decoder 202 decoding LA10, LA00, and LBHEN0: 000 enables bit positions [15:0]; 100 enables bit positions [31:16]. The steered data and the valid bits from decoder 202 are latched into the input data register 220, and the output thereof is directed through the encoder 234 to the output data register 240, where it is latched. State S0-1 is summarized in Table 2.

TABLE 2

SUMMARY OF STATES S0-0, S0-1, S0-2 and S11
(NC indicates No Change)

| RANK OF REGISTER | TAG | | | |
|---|---|---|---|---|
| | LA1x | LA0x | LBHENx | DATA |
| x = 0 (Tag 210, Data 220) | A1 | A0 | BHEN | CDATA_IN |
| x = 1 (Tag 211, Data 221) | NC | NC | NC | NC |
| x = 2 (Tag 212, Data 222) | NC | NC | NC | NC |
| x = 3 (Tag 213, Data 213) | NC | NC | NC | NC |

If A0 and BHEN are both 0, the first transfer is a word transfer. The state changes to S1-0 through condition C1 when WSTROBEN is non-asserted. When the second adjacent word is available, WSTROBEN is again asserted. Since signal ADJACENT is asserted L0, the state changes to S1-4 through condition C1. The values of the signals A1, A0 and BHEN are latched into tag register 211, and the second word asserted on lines CDATA_IN[15:0] is steered into certain bit positions of the input data register 221 by the steering circuit 215 under control of decoder 202 decoding LA11, LA01, LBHEN1, as follows: 100 enables bit positions [31:16]; 000 enables bit positions [15:0]. The steered data and the valid bits from the decoder 202 are latched into the input register 221, and the output thereof is combined with the output of the input register 220 in the wired-OR 235 of the encoder 234 and the combination is directed to the output data register 241, where it is latched. State S1-4 is summarized in Table 3.

TABLE 3

SUMMARY OF STATES S1-3 and S1-4
(NC indicates No Change)

| RANK OF REGISTER | TAG | | | |
|---|---|---|---|---|
| | LA1x | LA0x | LBHENx | DATA |
| x = 0 (Tag 210, Data 220) | NC | NC | NC | NC |
| x = 1 (Tag 211, Data 221) | A1 | A0 | BHEN | CDATA_IN |
| x = 2 (Tag 212, Data 222) | NC | NC | NC | NC |
| x = 3 (Tag 213, Data 213) | NC | NC | NC | NC |

If A0 and BHEN are both 0, which indicates a word address, the state changes to S2-2 through condition C2. In state S2-2, the multiplexer 250 selects output data register 241 and provides the output thereof as CDATA_OUT. The state then changes to S3, in which the write enable signal WREN is asserted. Note that WREN is abbreviated in FIG. 4 as WEN. The state then changes to S12, in which a delay, an extra state machine cycle, is added for timing purposes. The state machine 200 then returns to state S0, having presented two words having adjacent addresses within a single 32-bit doubleword on the output lines CDATA_OUT.

When either A0 or BHEN associated with the second transfer is 1, the second transfer is a byte transfer. When the byte of the second transfer is available, WSTROBEN is again asserted. Since signal ADJACENT is asserted, the state changes to S1-4 through condition C1. The values of the signals A1, A0 and BHEN are latched into tag register 211, and the byte of the second transfer asserted on lines CDATA_IN[7:0] or CDATA_IN[15:8] is steered into certain bit positions of the input data register 221 by the steering circuit 215 under control of decoder 202 decoding LA11, LA01, LBHEN1, as follows: 001 enables bit positions [7:0], 010 enables bit positions [15:8], 101 enables bit positions [23:16], and 110 enables bit positions [31:24]. The steered data and the valid bits from the decoder 202 are latched into the input register 221, and the output thereof is combined with the output of the input register 220 in the wired-OR 235 of the encoder 234 and the combination is directed to the output data register 241, where it is latched. State S1-4 is summarized in Table 3 above.

Since either A0 or BHEN of the second transfer is 1, the state machine 200 enters state S14. In state S14, the multiplexer 250 selects output data register 240 and provides its value as CDATA_OUT. The state then changes through condition C4 to S4-1, and write enable signal WREN is asserted.

Since either A0 or BHEN of the second transfer is 1, the state machine 200 enters state S11 while WST is nonasserted. In state S11, the values of the signals A1, A0 and BHEN are latched into tag register 210, and the byte of the second transfer asserted on lines CDATA_IN[7:0] or CDATA_IN[15:8] is steered into appropriate bit positions of the input data register 220 by the steering circuit 214 under control of the decoder 202 decoding LA10, LA00 and LBHEN0, as follows: 001 enables bit positions [7:0], 010 enables bit positions [15:8], 101 enables bit positions [23:16], and 110 enables bit positions [31:24]. The steered data and the valid bits are latched into the input data register 220, and the output thereof is directed through the encoder 234 to the output data register 240, where it is latched. State S11 is summarized in Table 2 above.

The state then changes to S13. In state S13, the multiplexer 250 selects output data register 240 and provides its value as CDATA_OUT. The state then changes to S6, in which the write enable signal WEN is asserted. The state then changes to S7, in which a delay, an extra state machine cycle, is added for timing purposes. The state machine 200 then returns to state S0, having presented the first word transfer and the subsequent byte transfer in two 32-bit doublewords on output lines CDATA_OUT.

Consider the case of an AT bus write bus cycle of two non-adjacent 16-bit words. Words are non-adjacent if address bits SA[19:2] of the first and second data words are not identical, as indicated by a nonasserted signal ADJACENT. The state machine 120 transitions through states S0, S0-1 and S1-0 as described above for word transfers having adjacent addresses, so that the values of the signals A1, A0 and BHEN are latched into tag register 210, and the first word is latched into the input data register 220 and copied to output data registers 240 through the encoder 234. However, when WSTROBEN is again asserted and signal ADJACENT is non-asserted, the state changes to S1-2 through condition C1. In state S1-2, the multiplexer 250 selects output data register 240 and provides its value as CDATA_OUT. The state then changes through condition C-4 to S4-1, in which the write enable signal WREN is asserted.

Since the second transfer is a word transfer for which A0 and BHEN are 0, the state changes to S8. In state S8, the LA0 bits of the tag registers 211–213 are set, the LA1 bits of the tag registers 211–213 are reset, and the LBHEN bits of the tag registers 211–213 are set, and the bits of the input data registers 221–223 are reset. The values of the signals A1, A0 and BHEN of the second word are latched into tag register 210, and the second word is steered into the appropriate bit positions of the input data register 220. This state effectively recharacterizes the non-sequential transferred second data word as a first data word. State S8 is summarized in Table 4.

TABLE 4

SUMMARY OF STATE S8

| RANK OF REGISTER | TAG | | | DATA |
|---|---|---|---|---|
| | LA1x | LA0x | LBHENx | |
| x = 0 (Tag 210, Data 220) | A1 | A0 | BHEN | CDATA_IN |
| x = 1 (Tag 211, Data 221) | 1 | 0 | 1 | 0 |
| x = 2 (Tag 212, Data 222) | 1 | 0 | 1 | 0 |
| x = 3 (Tag 213, Data 213) | 1 | 0 | 1 | 0 |

The state machine 200 then returns to state S1-0 through condition C1 while WSTROBEN is non-asserted, having presented the first word on the output lines CDATA_OUT, and recharacterizing the second word as a new first word.

If the second transfer is a byte transfer, as indicated when either A0 or BHEN associated with the second data word is 1, the state machine 200 makes transitions through states S11, S13, S6 and S7 as described above. The state machine 200 then returns to state S0, having presented the first word transfer and the subsequent non-adjacent byte transfer in two 32-bit doublewords on output lines CDATA_OUT.

Consider the case of two consecutive byte transfers. The embodiment of the state machine 200 shown in FIG. 4 does not pack byte transfers, and handles two consecutive byte transfers without considering whether they have adjacent or nonadjacent addresses. After transitions through states S0 and S0-1 for the first byte, the state changes to S10 when WTROBEN is non-asserted. In state S10, the contents of output data register 240 is selected by the multiplexer 250 and furnished as CDATA_OUT. The state then changes to S6, in which WREN is asserted. The state then changes to S7 for the insertion of a delay. The state machine 200 then returns to state S0, having presented the first byte in the 32-bit doubleword signal CDATA_OUT. The second byte is then handled like a first byte.

PAC PC and XT Bus Cycles

Consider the case of a PC or XT bus write bus cycle of four adjacent bytes. A PC or XT type bus is indicated to the PAC 142 by the bit cycle signal CR2B2_1 at 'b11. So long as the write strobe enable signal WSTROBEN (abbreviated in FIG. 3 as WST) is non-asserted, the PAC remains in state S0. While state S0 is current, the LA0 bits of the tag registers 210–213 are set, the LA1 bits of the tag registers 210–213 are reset, the LBHEN bits of the tag registers 210–213 are set, and the bits of the input data registers 220–223 are reset. State S0 is summarized in Table 1 above.

The state machine 200 changes to state S0-0 from state S0 through condition C0 on the assertion of WSTROBEN to indicate that a bus write cycle is enabled for the first data byte. The values of the signals A1, A0 and BHEN are latched into tag register 210, and the first data byte asserted on lines CDATA_IN[7:0] is steered into certain bit positions of the input data register 220 by the steering circuit 214 under control of the decoder 202 decoding LA10, LA00, and LBHEN0 as follows: 00x (x means "don't care") enables bit positions [7:0], 01x enables bit positions [15:8], 10x enables bit positions [23:16], and 11x enables bit positions [31:24]. The steered data and the valid bits from decoder 202 are latched into the input data register 220, and the output thereof is directed through the encoder 234 to the output data register 240, where it is latched. State S0-0 is summarized in Table 2 above. The state changes to S1-0 through condition C1 while WSTROBEN is non-asserted.

When the second adjacent byte is available, WSTROBEN is again asserted. Since signal ADJACENT is also asserted L0, the state changes to S1-3 through condition C1. In state S1-3, the values of the signals A1, A0 and BHEN are latched into tag register 211, and the second byte asserted on lines CDATA_IN[7:0] is steered into certain bit positions of the input data register 221 by the steering circuit 215 under control of the decoder 202 decoding LA10, LA00, and LBHEN0 as described above for the first byte. The steered data and the valid bits from decoder 202 are latched into the input data register 221, and the output thereof is combined with the output of the input register 220 in the wired-OR 235 of the encoder 234 and directed to the output data register 241, where it is latched. State S1-3 is summarized in Table 3 above.

When WSTROBEN is non-asserted, the state changes to S2-0 through condition C2. When the third data byte is available, WSTROBEN is again asserted and the state changes to S2-4 through condition C2, since ADJACENT is asserted. In state S2-4, the values of the signals A1, A0 and BHEN are latched into tag register 212, and the third byte asserted on lines CDATA_IN[7:0] is steered into certain bit positions of the input data register 221 by the steering circuit 216 under control of the decoder 202 decoding LA10, LA00, and LBHEN0 as described above for the first byte. The steered data and the valid bits from decoder 202 are latched into the input data register 222, and the output thereof is combined with the output of the wired-OR 235 in the wired-OR 236 of the encoder 234 and directed to the output data register 242, where it is latched. State S2-4 is summarized in Table 5 below.

TABLE 5

SUMMARY OF STATE S2-4
(NC indicates No Change)

| RANK OF REGISTER | TAG | | | DATA |
|---|---|---|---|---|
| | LA1x | LA0x | LBHENx | |
| x = 0 (Tag 210, Data 220) | NC | NC | NC | NC |
| x = 1 (Tag 211, Data 221) | NC | NC | NC | NC |
| x = 2 (Tag 212, Data 222) | A1 | A0 | BHEN | CDATA_IN |
| x = 3 (Tag 213, Data 213) | NC | NC | NC | NC |

When WSTROBEN is non-asserted, the state changes to S5-0 through condition C5. When the fourth data byte is available, WSTROBEN is again asserted and the state changes to S5-3 through condition C5, since ADJACENT is asserted. In state S5-3, the values of the signals A1, A0 and BHEN are latched into tag register 213, and the fourth byte asserted on lines CDATA_IN[7:0] is steered into certain bit positions of the input data register 221 by the steering circuit 217 under control of the decoder 202 decoding LA10, LA00, and LBHEN0 as described above for the first byte. The steered data and the valid bits from decoder 202 are latched into the input data register 223, and the output thereof is combined with the output of the wired-OR 236 in the wired-OR 237 of the encoder 234 and directed to the output data register 243, where it is latched. State S5-3 is summarized in Table 6 below.

TABLE 6

SUMMARY OF STATE S5-3
(NC indicates No Change)

| | TAG | | | |
|---|---|---|---|---|
| RANK OF REGISTER | LA1x | LA0x | LBHENx | DATA |
| x = 0 (Tag 210, Data 220) | NC | NC | NC | NC |
| x = 1 (Tag 211, Data 221) | NC | NC | NC | NC |
| x = 2 (Tag 212, Data 222) | NC | NC | NC | NC |
| x = 3 (Tag 213, Data 213) | A1 | A0 | BHEN | CDATA_IN |

The state then changes to S9. In state S9, the multiplexer 250 selects the output of output data register 243 as CDATA_OUT. The state then changes to S6, in which the write enable signal WREN is asserted. The state then changes to S7 for the insertion of a state machine delay. The state machine 200 then returns to state S0, having presented four adjacent bytes as a single 32-bit doubleword on the output lines CDATA_OUT.

Nonadjacent addresses for 8-bit bus cycles are indicated by signal ADJACENT. When the second byte is non-adjacent, the state machine 200 transitions through states S0, S0-0, S1-2 (output first byte as CDATA_OUT), S4-0 (WREN asserted), and S8 (second byte recharacterized as a first byte). The state machine 200 then returns to state S1-0, having presented one byte within a single 32-bit doubleword on the output lines CDATA_OUT, and recharacterizing the second byte as a new first byte. When the third byte is non-adjacent, the state machine 200 transitions through states S0, S0-0, S1-3, S2-0, S2-3 (outputs of output register 241 presented on output lines CDATA_OUT), S4-0 (WREN asserted), and S8 (third byte recharacterized as a first byte). The state machine 200 then returns to state S1-0, having presented two bytes having adjacent addresses within a single 32-bit doubleword on the output lines CDATA_OUT, and recharacterizing the third non-adjacent byte as a new first byte. When the fourth byte is non-adjacent, the state machine 200 transitions through states S0, S0-0, S1-3, S2-0, S2-4, S5-0, S5-2 (outputs of output register 242 presented on output lines CDATA_OUT), S4-0 (WREN asserted), and S8 (fourth byte recharacterized as a first byte). The state machine 200 then returns to state S1-0, having presented three bytes having adjacent addresses within a single 32-bit doubleword on the output lines CDATA_OUT, and recharacterizing the fourth non-adjacent byte as a new first byte.

Refresh Cycles

When the memory 149 is implemented as DRAM, the PAC 142 takes advantage of refresh cycles to write to the memory 149. If a refresh cycle is initiated in an 8-bit or 16-bit bus cycle when the state machine 200 is in state S1-0 (WSTROBEN non-asserted after the first data word received), the state changes to S1-1 to present the first data byte/word stored in output register 240 on the output signal lines CDATA_OUT, then to state S6 to assert WREN, then to state S7 to insert a delay, then to state S0 to receive a new data word or byte. This sequence presents the data word or byte as a single 32-bit doubleword on the output lines CDATA_OUT during the refresh cycle.

If a refresh cycle is initiated during an 8-bit bus cycle when the state machine 200 is in state S2-0 (WSTROBEN non-asserted after the second data byte received), the state changes to S2-1. In state S2-1, the output of the second output data register 241 is selected to provide the first and second bytes as part of a doubleword on the output signal lines CDATA_OUT. The state then changes to S6 to assert WREN, then to S7 to insert a delay, and then to state S0 to receive a new data word or byte. This sequence presents two data bytes with adjacent addresses as a single 32-bit doubleword on the output lines CDATA_OUT during the refresh cycle.

If a refresh cycle is initiated during an 8-bit bus cycle when the state machine 200 is in state S5-0 (WSTROBEN non-asserted after the third data byte received), the state changes to S5-1. In state S5-1, the output of the third output data register 242 is selected to provide the first, second and third data bytes as part of a doubleword on the output signal lines CDATA_OUT. The state then returns to S6 to assert WREN, then to S7 to insert a delay, then to state S0 to receive a new data word or byte. This sequence presents three data bytes with adjacent addresses as a single 32-bit doubleword on the output lines CDATA_OUT during the refresh cycle.

EISA and PCI Bus Cycles

The PAC 142 (FIG. 2) also supports 32-bit VESA and PCI buses with a suitable modification of the state machine 200. The modification is shown in FIG. 4 as a state S0-2, the transitions to which are shown in dashed lines. When CR2B2_1 indicates a VESA-type platform (10) or a PCI-type platform (00), the state changes to S0-2 from S0 through condition C0 on the assertion of WSTROBEN. The values of the signals A1, A0 and BHEN are latched into tag register 210, and the doubleword asserted on lines CDATA_IN[31:0] is steered into all bit positions of the input data register 220 by the steering circuit 214. The steered data with all valid bits set are latched into the input data register 220, and the output thereof is directed through the encoder 234 to the output data registers 240, where it is latched. State S0-2 is summarized in Table 2 above. The state then changes to S10 when WTROBEN is non-asserted. In state S10, the contents of output data register 240 is selected by the multiplexer 250 and furnished as CDATA_OUT. The state then changes to S6, in which WREN is asserted. The state then changes to S7 for insertion of a delay. The state machine 200 then returns to state S0, having presented the input doubleword on the output lines CDATA_OUT.

While the invention has been described with reference to various embodiments, it will be understood that these embodiments are illustrative and that the scope of the invention is not necessarily limited to them. Many variations, modifications, additions and improvements of the embodiments described are possible. These and other variations, modifications, additions and improvements may fall within the scope of the invention as defined in the following claims.

What is claimed is:

1. An apparatus for packing data for write access to a memory, comprising:
   means for receiving from a bus at first times a plurality of first input data items of a first width, and at second times different than the first times, a plurality of second input data items of a second width;
   said receiving means including:
      a plurality of tag registers;
      decoder circuitry connected to the outputs of said tag registers;
      a plurality of steering circuits having input circuits connected to the outputs of said decoder circuitry;

a plurality of input registers connected to the outputs of said steering circuits;

means including encoder means for packing the first input data items into a first output data item having a width greater than the first width, and the second input data items into a second output data item having a width greater than the second width, wherein the widths of the first and second output data items are equal, the packing means having a portion which is distinct from the receiving means; and means for writing the first and second output data items to the memory.

* * * * *